United States Patent [19]

Minoda et al.

[11] Patent Number: 5,453,974
[45] Date of Patent: Sep. 26, 1995

[54] OPTICAL DISK SUBSTRATE, METHOD FOR INITIALIZATION THEREOF AND DRIVING APPARATUS FOR INITIALIZATION OF SAID OPTICAL DISK

[75] Inventors: Takeshi Minoda; Shigeharu Fujii, both of Sodegaura, Japan

[73] Assignee: Mitsui Petrochemical Industries, Limited, Tokyo, Japan

[21] Appl. No.: 163,730

[22] Filed: Dec. 9, 1993

Related U.S. Application Data

[63] Continuation of Ser. No. 857,834, Mar. 26, 1992, abandoned.

[30] Foreign Application Priority Data

Mar. 28, 1991 [JP] Japan ..................................... 3-064697

[51] Int. Cl.$^6$ ........................................................ G11B 7/00
[52] U.S. Cl. ................................. 369/275.1; 369/275.4; 369/277; 369/58; 369/47
[58] Field of Search ........................... 369/47, 49, 48, 369/54, 58, 32, 275.1, 275.3, 275.4, 275.5, 277, 279; 360/77.04, 48, 39, 78.04

[56] References Cited

U.S. PATENT DOCUMENTS

| | | | |
|---|---|---|---|
| 4,519,056 | 5/1985 | Kimoto et al. | 369/58 |
| 4,819,095 | 4/1989 | Asano et al. | 360/77.04 |
| 4,839,753 | 6/1989 | Ide et al. | 360/48 |
| 4,847,704 | 7/1989 | Iizumi et al. | 360/48 |
| 5,138,599 | 8/1992 | Fukushima | 369/54 |

FOREIGN PATENT DOCUMENTS

| | | |
|---|---|---|
| 0080256 | 1/1983 | European Pat. Off. . |
| 3604916 | 8/1986 | Germany . |
| 61-210564 | 9/1986 | Japan . |
| 2119998 | 11/1983 | United Kingdom . |

OTHER PUBLICATIONS

*IBM Technical Disclosure Bulletin,* vol. 30, No. 12, May 1988, pp. 454–455.

*Primary Examiner*—Georgia Y. Epps
*Assistant Examiner*—Muhammad N. Edun
*Attorney, Agent, or Firm*—Birch, Stewart, Kolasch & Birch

[57] ABSTRACT

There are provided an optical disk substrate formatted according to the zone formatted system, method for initialization thereof, and driving apparatus for initialization of the optical disk. The optical disk substrate is initialized while at least one track in the vicinity of the inner peripheral side and/or the outer peripheral side in the radial direction of the boundary between an optional zone and another zone situated on the outer peripheral side is left unused as a recording area. By virtue of this construction, at least one of the tracks having a high possibility of bringing about the pit shift or double transfer is left unused as a recording area. Accordingly, the information stored in a recording area can be read out without being influenced by the occurrence of the pit shift or double transfer, and thus it is possible to get rid of the occurrence of a burst error caused by such pit shift or double transfer.

13 Claims, 6 Drawing Sheets

OPTICAL DISK SUBSTRATE, METHOD FOR INITIALIZATION THEREOF AND DRIVING APPARATUS FOR INITIALIZATION OF SAID OPTICAL DISK

This application is a continuation of application Ser. No. 07/857,834, filed on Mar. 26, 1992, now abandoned.

FIELD OF THE INVENTION

This invention relates to an optical disk substrate, method for initialization thereof and driving apparatus for the initialization of said optical disk, wherein said intialized optical disk is capable of making it possible to read out the stored information in a stable manner, even if, during molding the disk, a pit to be formed on a preformatted portion (header portion) of a sector in an optical zone is transferred as a ghost to a data portion of a sector in a zone adjacent to an inner peripheral or outer peripheral side of said optional zone.

BACKGROUND OF THE INVENTION

On the surface of optical disk substrate, tracks are formed spirally or concentrically, and a number of sectors are defined on the tracks. The sector, when roughly divided, comprises a preformatted header portion, and a data portion in which information or other is written. At the outset of the data portion, there is provided a flag portion. The header portion is a place in which a physical lot number of the disk corresponding to the sector, that is, a track number, sector number or the like, has been written. When the optical disk substrate is molded, a row of pits is formed on this header portion, and no pit is formed in other portions and the data portion.

Figure 6:
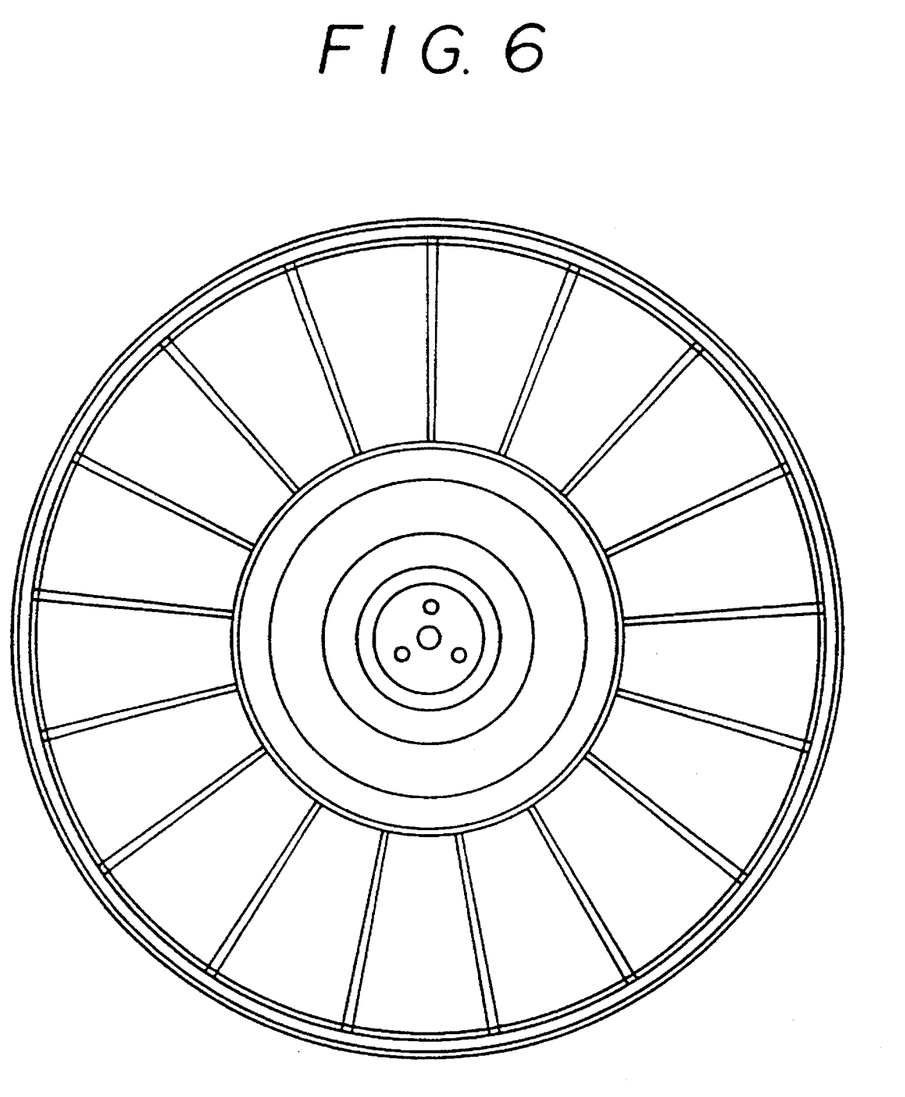
FIG. 6 is a front view of an optical disk substrate formatted according to the CAV system.

The formation of these sectors has heretofore been carried out according to CAV (Constant Angular Velocity) system formation. In this system, as shown in FIG. 6, the number of sectors laid out per circle is the same, either in the inner peripheral region of the disk or in the outer peripheral region of said disk. That is to say, although the memory capacity per sector is the same, the sector located in the outer peripheral region of the disk comes to have a longer recording area than the recording area of the sector located in the inner peripheral zone. Accordingly, this CAV system has such a drawback that the optical disk resulting therefrom has a relatively small total memory capacity.

As a way to solve such drawbacks as small memory capacity, there have recently been proposed as a sector formation system the zone formatted system, that is called MCAV (Modified Constant Angular Velocity) or ZCAV (Zoned Constant Angular Velocity) systems, and there is a growing tendency that the CAV system will give way to the zone formatted system in the near future. In this zone formatted system, the length of recording area per sector present is almost the same, either in the inner peripheral region of the disk or in the outer peripheral region, and the number of sectors per circle increases toward the outer peripheral region. On that account, the optical disks formatted according to the zone formatted system can have a memory capacity larger than that of the disks formatted according to the CAV system.

Figure 5:
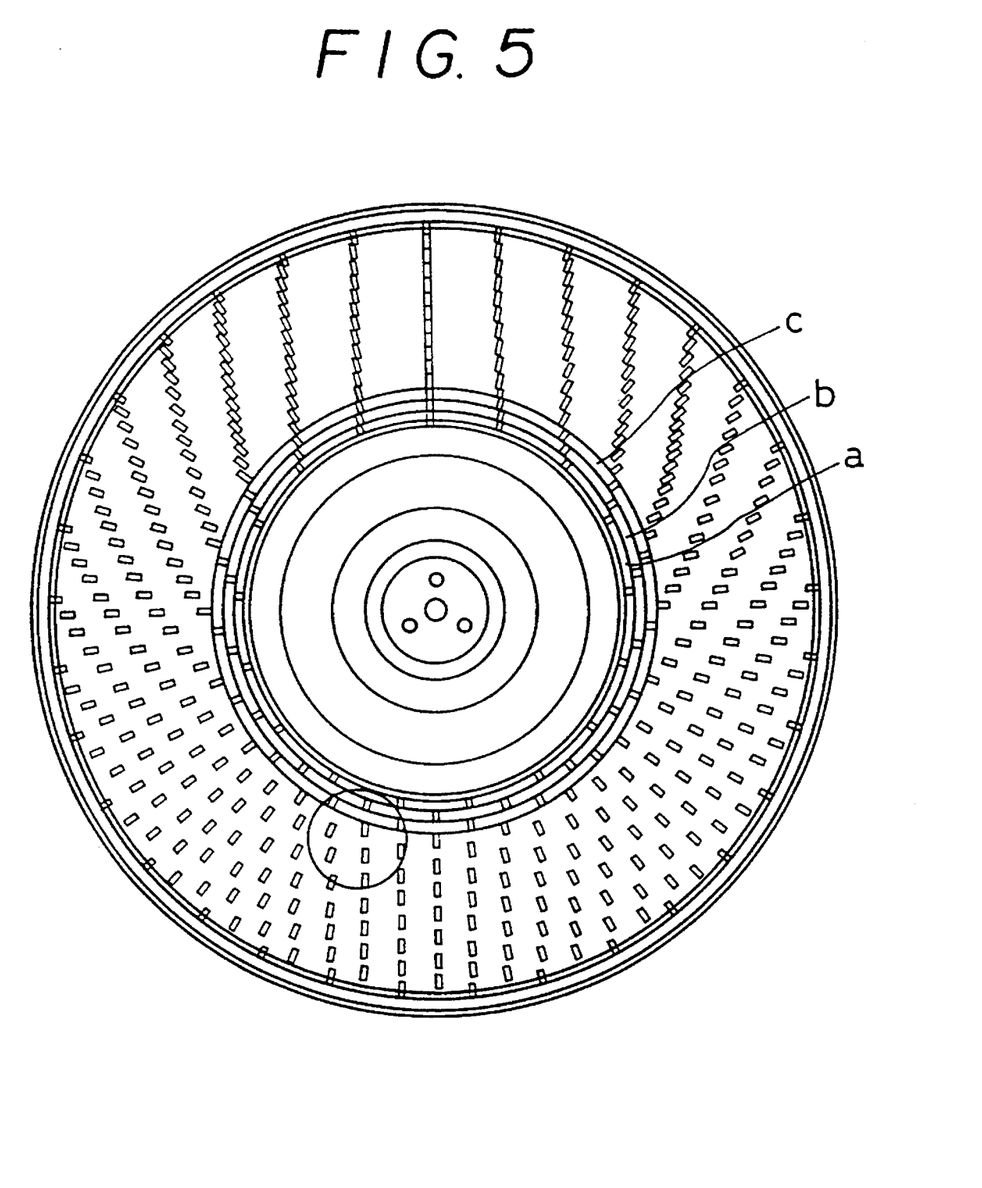
FIG. 5 is a front view of an optical disk substrate formatted according to the zone formatted system, showing formation of the zones and sectors.

In this zone formatted system, a number of tracks are divided into groups so that each group defines a zone, as shown in FIG. 5. That is, the tracks are divided in the radial direction into groups so that each group has a predetermined number of tracks and defines one zone, and each track is divided into a predetermined number of sectors in the circumferential direction. The number of the sectors of each zone is increased one by one with the approach of the zone to the outer peripheral region. For example, in FIG. 5, there have been laid out 17 sectors per circle in the zone represented by the symbol a, 18 sectors per circle in the sector represented by the symbol b, and 19 sectors per circle in the sector represented by the symbol c.

Figure 3:
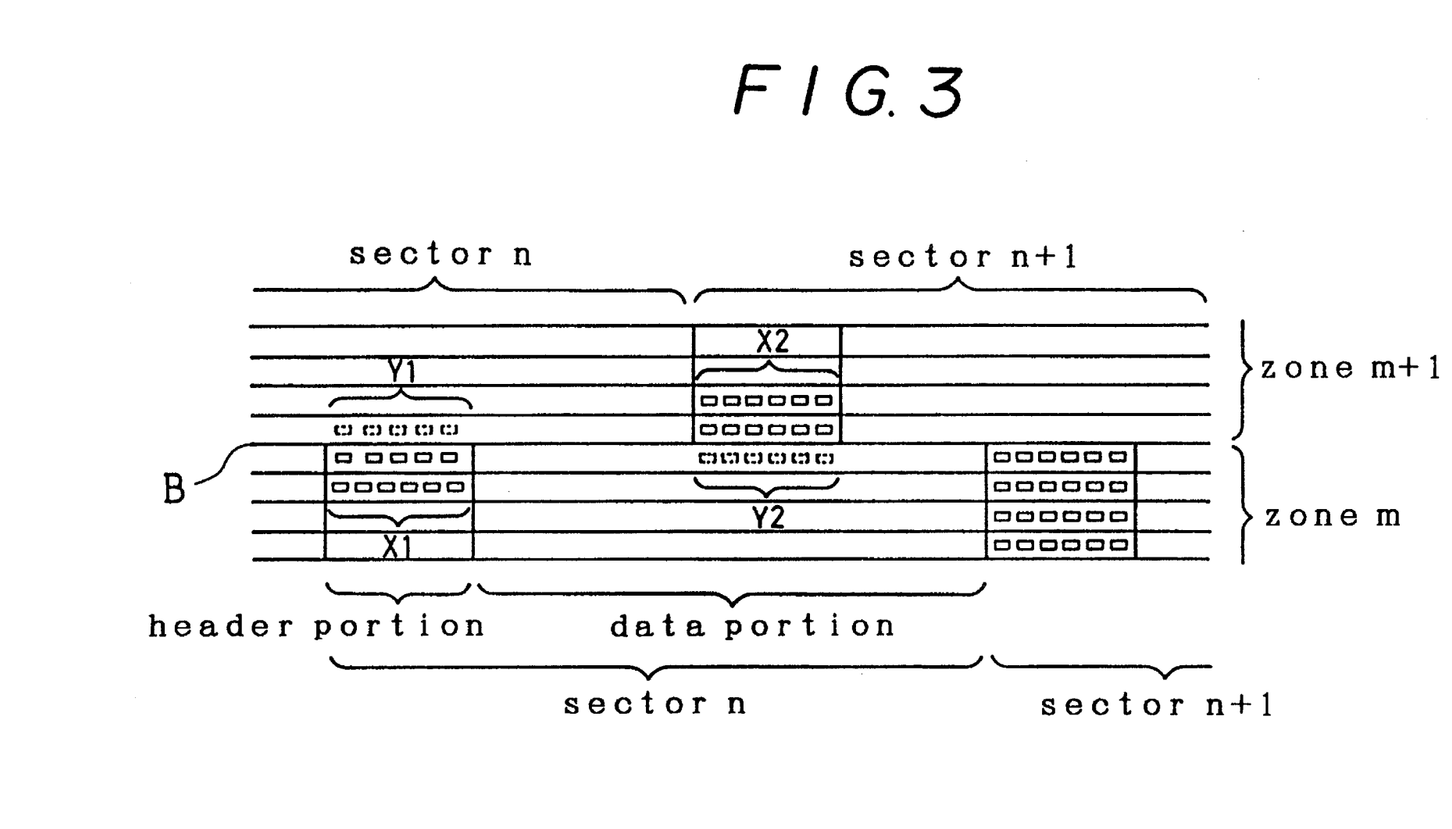
FIG. 3 shows an enlargement of a circled portion of a recording area of an optical disk substrate shown in FIG. 5.
Figure 4:
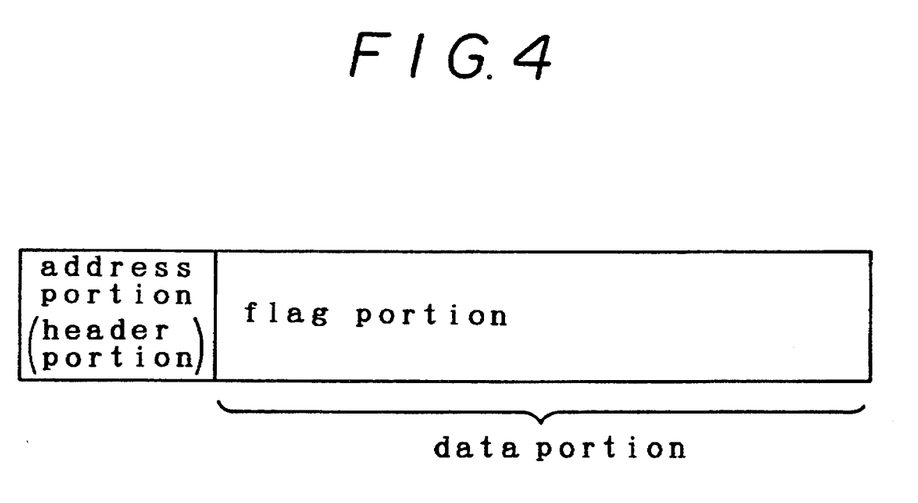
FIG. 4 is a schematic view illustrating formation of the sectors on the recording area of the optical disk substrate.

As can be seen from the foregoing, the number of sectors which one zone includes per circle are different from that of sectors which the other zone adjacent to said one zone includes per circle. On that account, in the portion of FIG. 5 enclosed by a circle, next to the header portion of the sector of the final track of one zone is not laid out the header portion of the sector of the first track of the next zone, but is laid out the data portion of the sector of the first track of the next zone. For the sake of convenience of illustration, the enclosed portion of FIG. 5 is enlarged and shown in FIG. 3. In FIG. 3, the zones are assumed as a zone (m) and a zone (m+1), respectively, and the sectors laid out in the circumferential direction of these two neighboring zones are assumed as a sector (n) and a sector (n+1), respectively. As can be seen from FIG. 3, for example, next to the header portion of the final sector (n) of the track of the zone (m) is laid out the data portion of the first sector (n) of the track of the zone (m+1). Inversely, next to the header portion of the first sector (n+1) of the zone (m+1) is laid out the data portion of the final sector (n) of the track of the zone (m).

In contract, in the case of CAV system, the sectors are equal in number, either in the inner periphery or in the outer periphery, as shown in FIG. 6, and hence the preformat portions of each sector are uniformly laid out straight in the radial direction.

Usually, optical disk substrates are molded by injection molding using a negative model known as a stamper fitted in a mold which is set to an injection molding machine. In practicing the injection molding of the optical disk substrate according to the zone formatted system, it is a matter of course that the pits to be transferred from the stamper to the header portion can be transferred and formed in the proper position. However, in the boundary portion between the zone and a zone of the outer peripheral side, the pits X1 formed in the header portion of the sector (n) of the zone (m) are sometimes transferred as a ghost Y1 (as shown by dotted line in FIG. 3) to the data portion of the zone (re+1). The circumstances under which this ghost takes place are extremely variable, and are roughly divided into the case (commonly known by pit shift) where the ghost Y1 is formed in the manner as if the pits X1 are dragged in the boundary and the case (commonly known as double transfer) where the ghost Y1 is formed independent of the X1.

The ghost Y1 takes place in one track or sometimes in several tracks. The pit shift or double transfer, which takes place in the boundary between the zones, is observed, as shown in FIG. 3, at the outer peripheral side (relation between X1 and Y1) or at the inner peripheral side (relation between X2 and Y2) of the zones. It is also known by experience that because of irregular formation of header portions of the sectors, the pit shift or double transfer is more apt to take place in the case of the zone formatted system in comparison with the case of CAV system. For the sake of convenience of illustration in FIG. 3, the pits X1 and X2, and the ghosts Y1 and Y2 are drawn much larger than life.

In such a case, because the header portions of each sector are in line in the radial direction in the CAV system, the pit shift or double transfer takes place in the adjacent header portion. On that account, even if the pit shift takes place in the CAV system, that is not much of a problem in most cases.

In the zone formatted system, however, the pit shift and double transfer do not take place in the header portions but in the data portions. Particularly, in the case of magnetooptical disks, a delicate rotation of a plane of polarization is sensed, thereby reading out data recorded in the disk. On that account, if the pit shift or double transfer takes place in the data portion, the plane of polarization is disturbed so that noises are carried on the reading signal, thereby bringing about occasional errors (burst errors) amounting to scores of bytes. According to the experiment conducted by the present inventor, the noises caused by the occurrence of the pit shift were larger than the real reading signals, and the burst errors took place. Whether the burst errors take place or not, or how large they become depends on the degree of the pit shift or double transfer and the performance of the disk drive used. In short, the recording regions in which the pit shift or double transfer took place are in a very unstable state.

OBJECT OF THE INVENTION

An object of the present invention is to provide optical disk substrate, method for initialization thereof, and driving apparatus for initialization of said optical disk, wherein said initialized optical disk is capable of making it possible to read out the stored information in a stable manner, even if the pit shift or double transfer of the pits of the header portion takes place on the outer peripheral or inner peripheral side of the boundary between an optional zone and a zone next thereto.

SUMMARY OF THE INVENTION

According to the present invention, there is provided a method for initialization of an optical disk substrate formatted by a sector formation according to a zone formatted system, wherein a plurality of tracks are formed spirally or concentrically thereon, and the tracks are divided in the radial direction into groups, so that each group has a predetermined number of tracks and defines a zone, each track of the zone being divided into a predetermined number of sectors in the circumferential direction, characterized in that the optical disk substrate is initialized while at least one track in the vicinity of the inner and/or the outer peripheral side in the radial direction of the boundary between an optional zone and another zone situated in the outer peripheral side of said optional zone is left unused as a recording area.

In the present invention, it is so designed, as mentioned above, that at least one track may not be used as the recording area, said track being adjacent to the inner peripheral side and/or the outer peripheral side in radial direction a boundary between the zones, and being high in possibility or being subject to the pit shift of double transfer. Accordingly, even if the pit shift or double transfer takes place in the manner as mentioned above, information stored in a recording area may be read out without being subject to any adverse influence of the pit shift or double transfer thus caused. On that account, there is no fear, in the present invention, that the burst errors caused by the pit shift or double transfer will take place.

Said track left unused as the recording area may be at least one track in the vicinity of the inner peripheral side in the radial direction of said boundary.

Alternatively, said track left unused as the recording area may be at least one track in the vicinity of the outer peripheral side in the radial direction of said boundary.

Further, said track left unused as the recording area may be at least one track in the vicinity of the inner peripheral side in the radial direction of said boundary and at least one track in the vicinity of the outer peripheral side in the radial direction of said boundary.

Further, said track left unused as the recording area may be at least one track in the vicinity of the inner and the outer peripheral side in the radial direction of said boundary.

The track left unused as the recording area includes at least one track adjacent to the inner or outer peripheral side in the radial direction of the boundary.

The tracks left unused as the recording area include:

one track adjacent to the inner peripheral side in the radial direction of the boundary; and another track adjacent to the outer peripheral side in the radial direction of the boundary.

The tracks left unused as the recording area include:

at least two tracks adjacent to the inner peripheral side in the radial direction of the boundary; and at least two other tracks adjacent to the outer peripheral side in the radial direction of the boundary.

The tracks left unused as the recording area include:

one track adjacent to the inner peripheral side in the radial direction of the boundary; and at least two other tracks adjacent to the outer peripheral side in the radial direction of the boundary.

The tracks left unused as the recording area include:

one track adjacent to the outer peripheral side in the radial direction of the boundary; and at least two other tracks adjacent to the inner peripheral side in the radial direction of the boundary.

Because the optical disk substrate and apparatus for the initialization of said disk substrate according to the present invention are substantially the same as the method of initialization illustrated above, the descriptions of the first-named are omitted herein.

DETAILED DESCRIPTION OF THE INVENTION

Figure 1:
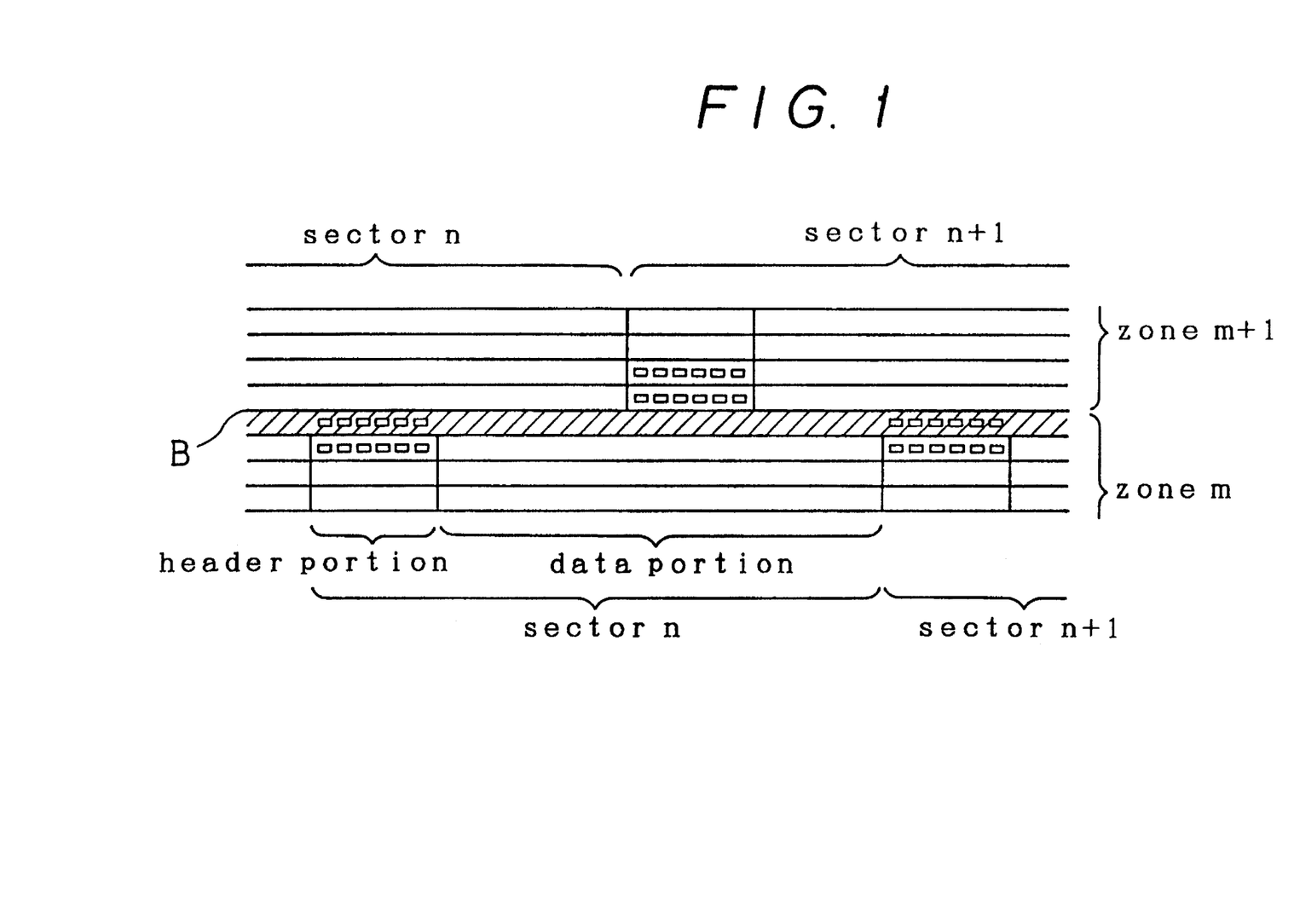
FIG. 1 shows an enlargement of a circled portion of a recording area of an optical disk substrate shown in FIG. 5.

Preferred embodiments of the present invention are illustrated below with reference to the accompanying drawings. FIG. 1 shows, in the same manner as in FIG. 3, an enlargement of an encircled portion of FIG. 5 for the sake of illustration.

The first embodiment of the optical disk substrate, method of initialization thereof and driving apparatus for the initialization of said disk substrates of the present invention corresponds to the circumstances wherein the pit shift or double transfer takes place on the inner peripheral side in the radial direction of a boundary between the zones. In the step of initializing optical disk substrates, it is so designed that, as shown by batching in FIG. 1 for example, one track adjacent to the inner peripheral side in the radial direction of a boundary B, that is, one track adjacent to the inner peripheral side in the radial direction of a boundary of every zone, may not be used as a recording area. Preferably, it is so designed that two tracks adjacent to the inner peripheral side in the radial direction of a boundary B, that is, two tracks adjacent to the inner peripheral side in the radial direction of a boundary of every zone, may not be used as recording areas. More preferably, it is so designed that three tracks adjacent to the inner peripheral side in the radial direction of a boundary B, that is, three tracks adjacent to the inner peripheral side in the radial direction of a boundary of every zone, may not be used as recording areas. Most preferably, it is so designed that four tracks adjacent to the inner peripheral side in the radial direction of a boundary B, that is, four tracks adjacent to the inner peripheral side in the radial direction of a boundary of every zone, may not be used as recording areas.

The second embodiment of the invention corresponds to the circumstances wherein the pit shift or double transfer takes place on the outer peripheral side in the radial direction of a boundary of a zone. In the step of initializing optical disk substrates, it is so designed that on track adjacent to the outer peripheral side in the radial direction of a boundary B, as shown in FIG. 1, that is, one track adjacent to the outer peripheral side in the radial direction of a boundary of every zone, may not be used as a recording area. Preferably, it is so designed that two tracks adjacent to the outer peripheral side in the radial direction of a boundary B, that is, two tracks adjacent to the outer peripheral side in the radial direction of a boundary of every zone, may not be used as recording areas, and especially, it is so designed that three tracks adjacent to the outer peripheral side in the radial direction of a boundary B, that is, three tracks adjacent to the outer peripheral side in the radial direction of a boundary of every zone, may not be used as recording areas. Most preferably, it is so designed that four tracks adjacent to the outer peripheral side in the radial direction of a zone B, that is four tracks adjacent to the outer peripheral side in the radial direction of a boundary of every zone, may not be used as recording areas.

The third embodiment of the invention corresponds to the circumstances wherein the pit shift or double transfer takes place to a slight degree on the inner and outer peripheral sides in the radial direction of a boundary between the zones. In the step of initializing optical disk substrates, it is so designed that one track adjacent to the inner peripheral side in the radial direction of a boundary B and one track adjacent to the outer peripheral side thereof, as shown in FIG. 1, that is, one track adjacent to the inner peripheral side in the radial direction of a boundary of every zone and one track adjacent to the outer peripheral side thereof, may not be used as recording areas.

The fourth embodiment of the invention corresponds to the circumstances wherein the pit shift or double transfer takes place on the inner and outer peripheral sides in the radial direction of a boundary between the zones. In the step of initializing optical disk substrates, it is so designed that four tracks adjacent to the inner and outer peripheral sides in the radial direction of a boundary B shown in FIG. 1, that is, two tracks adjacent to the inner peripheral side and two tracks adjacent to the outer peripheral side in the radial direction of boundaries between all the other zones, may not be used as recording areas. Preferably, it is so designed that six tracks adjacent to the inner and outer peripheral sides in the radial direction of a boundary B, that is, three tracks adjacent to the inner peripheral side and three tracks adjacent to the outer peripheral side in the radial direction of boundaries between all the other zones, may not be used as recording areas, and especially it is so designed that eight tracks adjacent to the inner and outer peripheral sides in the radial direction of a boundary B, that is, four tracks adjacent to the inner peripheral side and four tracks adjacent to the outer peripheral side in the radial direction of boundaries between all the other zones, may not be used as recording areas. In this connection, the number of tracks that are not used on the inner and outer peripheral sides thereof may be different from each other, if the number of unused tracks is at least two.

The fifth embodiment of the invention corresponds to the circumstances wherein the pit shift or double transfer takes place mainly on the inner peripheral side in the radial direction of a boundary between the zones, but there is a possibility that the pit aberration or double transfer will take place on the outer peripheral side. In the step of initializing optical disk substrates, it is so designed that two tracks adjacent to the inner peripheral side in the radial direction of a boundary B and one track adjacent to the outer peripheral side, that is, two tracks adjacent to the inner peripheral side and one track adjacent to the outer peripheral side in the radial direction of boundaries between all the other zones, may not be used as recording areas. Preferably, it is so designed that three tracks adjacent to the inner peripheral side and one track adjacent to the outer peripheral side in the radial direction of a boundary B, that is, three tracks adjacent to the inner peripheral side and one track adjacent to the outer peripheral side in the radial direction of the boundaries between all the other zones, may not be used as recording areas, and especially it is so designed that four tracks adjacent to the inner peripheral side and one track adjacent to the outer peripheral side in the radial direction of a boundary B, that is, four tracks adjacent to the inner peripheral side and one track adjacent to the inner peripheral side in the radial direction of the boundaries between all the other zones, may not be used as recording areas.

The sixth embodiment of the invention corresponds to the circumstances wherein the pit shift or double transfer mainly takes place on the outer peripheral side in the radial direction of a boundary between the zones, but there is a possibility that the pit shift or double transfer will take place on the inner peripheral side. In the step of initializing optical disk substrates, it is so designed that two tracks adjacent to the outer peripheral side and one track adjacent to the inner peripheral side in the radial direction of a boundary B as shown in FIG. 1, that is, two tracks adjacent to the outer peripheral side and one track adjacent to the inner peripheral side in the radial direction of the boundaries between all the other zones, may not be used as recording areas. Preferably, it is so designed that three tracks adjacent to the outer peripheral side and one track adjacent to the inner peripheral side in the radial direction of a boundary B, that is, three tracks adjacent to the outer peripheral side and one track adjacent to the inner peripheral side in the radial direction of the boundaries between all the other zones, may not be used as recording areas, and especially it is so designed that four tracks adjacent to the outer peripheral side and one track adjacent to the inner peripheral side in the radial direction of a boundary B, that is, four tracks adjacent to the outer peripheral side and one track adjacent to the inner peripheral side in the radial direction of the boundaries B between all the other zones, may not be used as recording areas.

In the first to sixth embodiments of the invention, the decision as to whether the tracks only on the inner peripheral side of a boundary B between the zones are designed so as not to be used, or as to whether the tracks only on the outer peripheral sides of the boundary B between the zones are designed so as not to be used, or as to whether the tracks both on the inner and outer peripheral sides of the boundary B between the zones are designed so as not to be used, may be made according to the circumstances wherein the pit shift or double transfer takes place. In these embodiments mentioned above, there is such an advantage that it is simple to memorize, in memory means of an optical disk initialization drive, the address of sectors of the track not used as a recording area because the pattern and number of unused tracks are the same on the boundaries between all the zones.

The seventh embodiment of the invention aims at decreasing in number of tracks which are not used as recording areas even if the decrease is slight. That is, prior to the initialization, the occurrence of the pit shift or double transfer is examined by means of sampling typical representatives of a series of optical disk substrates. As the result, only tracks in which the pit shift or double transfer took place, and only tracks having a possibility that the pit shift or double transfer will take place, are decided so as not to be used as recording areas. Regarding to a predetermined number of zones, for example, k pieces of zones located, from the inner peripheral side, only two tracks on the inner peripheral side of a boundary between the zones are designed so as not to be used as recording areas. In comparison with the first embodiment of the invention, this seventh embodiment has such an advantage that the memory capacity of the whole optical disk substrates will not decrease.

So long as the present invention is not hindered from accomplishing its object, the tracks which are not used as recording areas may be decided by any procedure other than those employed in the first to seventh embodiments of the invention.

In the step of initializing optical disk substrates according to the present invention, it is so designed that a track or tracks having a possibility of bringing out the pit shift or double transfer are determined so as not to be used as recording areas. On that account, when the information stored in the recording area other than unused tracks is read out, the reading-out operation can be carried out without being influenced by the pit shift or double transfer, and there is no possibility of experiencing burst error. Accordingly, it becomes possible to read out the stored information stably.

Figure 2:
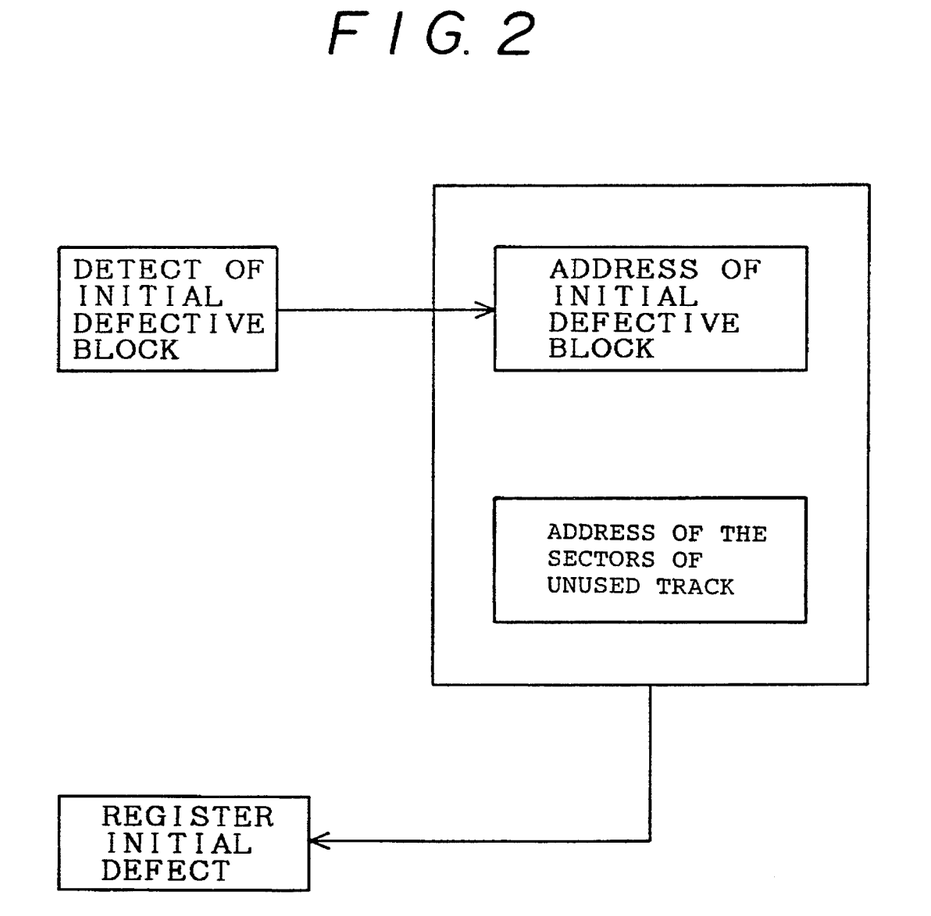
FIG. 2 is an example of flow chart used in practicing the present invention.

As a first actually embodiment of practicing actually the invention, at the end of the initialization, an address of unused blocks defined as initial defective blocks, that is, a track number and sector number of the initial defective blocks, are registered in the initial defective block list recording area of the disk, and at the same time, the address of each sector of the above-mentioned tracks determined not to be used is registered as initial defects therein. That is, the address of sectors in the tracks not used as recording areas is primarily registered in a memory means, such as ROM, etc. of a driving apparatus for initialization of the disk Thereafter, at the time of registration of the initial defective blocks, the address of each sector of the tracks primarily memorized and determined not to be used is registered as an initial defect. The areas in which the initial defective blocks are registered are provided, for example, with the innermost and outermost peripheral sides of the track usable as a user area of the disk. FIG. 2 is to show an example of this process by way of a flow chart. In a process of the initialization, after storing actually information of a definite pattern in an optical disk substrate, the stored information is then read out, an initial defective block is detected, and the address of the detected block is memorized in the memory of the driving apparatus. The definition of initial defective blocks is framed on such standard, for example, as the fact that the address formed on header portion is not readable or a bust error having a magnitude exceeding a definite level takes place. When the initial defective block thus detected is registered in the initial defective block list recording area, the sector address of the unused track primarily memorized in ROM, etc. of the driving apparatus is simultaneously registered therein.

As a second practicing embodiment, at the time of the initialization, in the flag portion of the sector of the above-mentioned unused track, is stored the information that said sector is unused. That is, the address of the sector in the track unused as a recording area is memorized in advance in the memory means such as ROM, etc. of the optical disk driving apparatus through which the initialization is effected. Thereafter, at the time of the initialization, in a process for detecting the initial defective block, a judgement is made as to whether said sector is on the unused track or not, and when said sector is on the unused track, in the flag portion of said sector, is stored the information that said sector is left unused.

As a third practicing embodiment, at the end of the initialization, in the flag portion of the sector of the above-mentioned unused track, is stored the information that said sector is unused. That is, the address of the sector in the track unused as a recording area is memorized in advance in the memory means such as ROM, etc. of an optical disk driving apparatus through which the initialization is effected. Thereafter, at the end of the initialization, in the flag portion of the sector on the unused track, is stored the information that said sector is left unused, In practicing actually any of the first to third practicing embodiments, the circumstance of the track left unused may be any of the first to seventh embodiments of the invention mentioned above. That is, in actually practicing any of the first to third practicing embodiments, as stated in the first embodiment of the above-mentioned unused track, it may be so designed that any of the 1,2,3 or 4 tracks adjacent to the inner peripheral side in the radial direction of the boundary of every zone is left unused. Further, as stated in the second embodiment of the above-mentioned unused track, it may be so designed that any of 1,2,3 and 4 tracks adjacent to the outer peripheral side in the radial direction of the boundary of every zone may be left unused. As stated in the third embodiment of the above-mentioned unused track, it may be so designed that one track adjacent to the inner peripheral side in the radial direction and one track adjacent to the outer peripheral side in the radial direction of the boundary of every zone may be left unused. As stated in the fourth embodiment of the above-mentioned unused track, it may be so designed that any one of 2, 3 and 4 tracks adjacent to the inner peripheral side in the direction of the boundary of every zone and any one of 2, 3 and 4 tracks adjacent to the outer peripheral side in the radial direction of the boundary of every zone may be left unused. As stated in the fifth embodiment of the above-mentioned unused track, it may be so designed that any one of 2, 3 and 4 tracks adjacent to the inner peripheral side in the radial direction of the boundary of very zone and one track adjacent to the outer peripheral side in the radial direction of the boundary of the zone may be left unused. As stated in the sixth embodiment of the above-mentioned unused track, it may be so designed that any one of 2, 3 and 4 tracks adjacent to the outer peripheral side in the radial direction of the boundary of every zone and one track adjacent to the inner peripheral side in the radial direction of the boundary of the zone may be left unused. Furthermore, as stated in the seventh embodiment of the above-mentioned unused track, it may be so designed that prior to the initialization, the occurrence of the pit shift or double transfer is examined by means of sampling typical representatives of a series of optical disk substrates, and as the result of overall judgement, only tracks in which the pit shift or double transfer took place and only tracks having a possibility that the pit shift or double transfer will take place are determined not to be used as recording areas.

In the present invention, it is so designed that the tracks adjacent to the inner peripheral side and the outer peripheral side in the radial direction of the boundaries of the zones, said tracks being high in a possibility of forming the pit shift or double transfer, may be left unused as recording areas. Accordingly, the information stored in the recording area other than the unused tracks mentioned above may be read out without being influenced by the pit shift or double transfer, and there is no possibility that a burst error caused by such pit shift or double transfer will take place.

What is claimed is:

1. An optical disc formatted in a zone-formatted system, wherein each zone is arranged in the radial direction so as to contain a predetermined number of tracks, each of said tracks is divided in the circumferential direction so as to define sectors, each of which involve a data portion, at least one track radially inside or outside or both inside and outside of a boundary between said zones is a blank track on which the data portion of each sector is to be left blank, and addresses of all said sectors on each blank track are registered into a common area on said optical disk.

2. The optical disk of claim 1, wherein said common area has further registered thereinto an address of a primary defective sector which is detected from said optical disk.

3. The optical disk of claim 1, wherein said common area is provided on the inner or outer periphery of said optical disk.

4. The optical disk of claim 1, wherein said blank tracks include at least one of:
   one track radially adjacent to and inside of said boundary; and
   one track radially adjacent to and outside of said boundary.

5. The optical disk of claim 1, wherein said blank tracks include both of:
   one track radially adjacent to and inside of said boundary; and
   one track radially adjacent to and outside of said boundary.

6. The optical disk of claim 1, wherein said blank tracks include:
   at least two tracks radially adjacent to and inside of said boundary; and
   at least two tracks radially adjacent to and outside of said boundary.

7. The optical disk of claim 1, wherein said blank tracks include:
   one track radially adjacent to and inside of said boundary; and
   at least two tracks radially adjacent to and outside of said boundary.

8. The optical disk of claim 1, wherein said blank tracks include:
   one track radially adjacent to and outside of said boundary; and
   at least two tracks radially adjacent to and inside of said boundary.

9. A method of initializing an optical disk formatted in a zone-formatted system, wherein each zone is arranged in the radial direction so as to contain a predetermined number of tracks, each of said tracks being divided in the circumferential direction so as to define sectors each of which involve a data portion, comprising:
   registering addresses of all sectors on a blank track on which the data portion of each sector is to be left blank into a common area on said optical disk, said track being radially inside or outside or both inside and outside of a boundary between said zones.

10. The method of claim 9, further including:
    detecting a primary defective sector on said optical disk; and
    registering an address of the primary defective sector into said common area.

11. A method of initializing an optical disk of claim 9, comprising:
    memorizing addresses of all sectors on a blank track on which the data portion is to be left blank in a memory of a driving apparatus, said track being radially inside or outside or both inside and outside of a boundary between said zones;
    detecting a primary defective sector on said optical disk and memorizing an address of the primary defective sector in a memory of the driving apparatus;
    registering the memorized addresses of all said sectors on the blank track into a common area on said optical disk; and
    registering the memorized address of the primary defective sector into said common area.

12. An optical disc formatted in a zone-formatted system, wherein each zone is arranged in the radial direction so as to contain a predetermined number of tracks, each of said tracks is divided in the circumferential direction so as to define sectors, each of which involve a data portion, at least one track radially inside or outside or both inside and outside of a boundary between said zones is a blank track on which the data portion of each sector is to be left blank, and addresses of all said sectors on each blank track are registered into a common area on the inner or outer periphery of said optical disk.

13. A method of initializing an optical disk formatted in a zone-formatted system, wherein each zone is arranged in the radial direction so as to contain a predetermined number of tracks, each of said tracks being divided in the circumferential direction so as to define sectors each of which involve a data portion, comprising:
    registering addresses of all the sectors on a blank track on which the data portion of each sector is to be left blank into a common area on the inner or outer periphery of said optical disk, said track being radially inside or outside or both inside and outside of a boundary between said zones.

* * * * *